April 8, 1952          J. E. HENRY          2,591,698
SHORAN MECHANICAL STRAIGHT-LINE COMPUTER
Filed Jan. 15, 1947          4 Sheets-Sheet 1
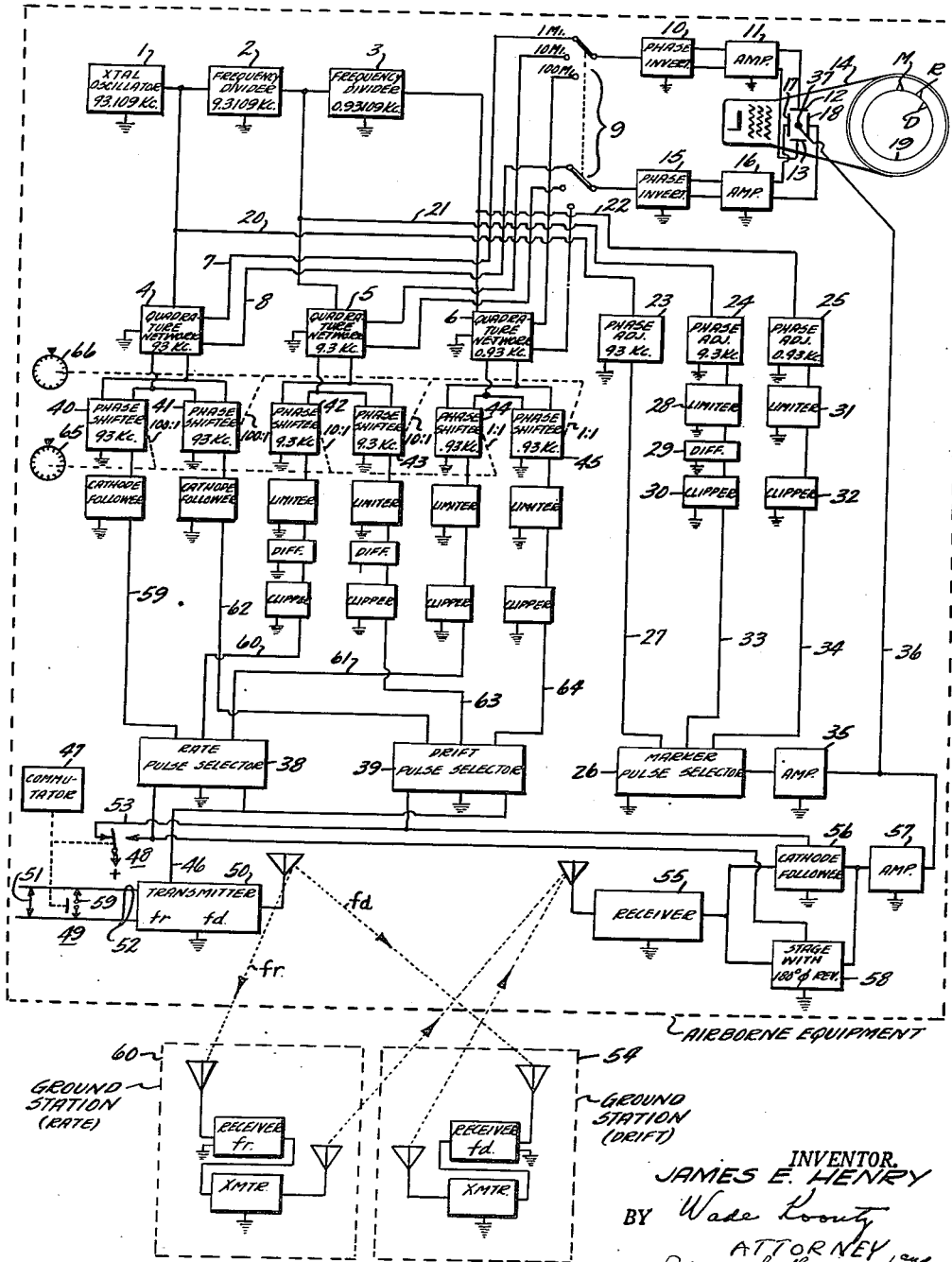

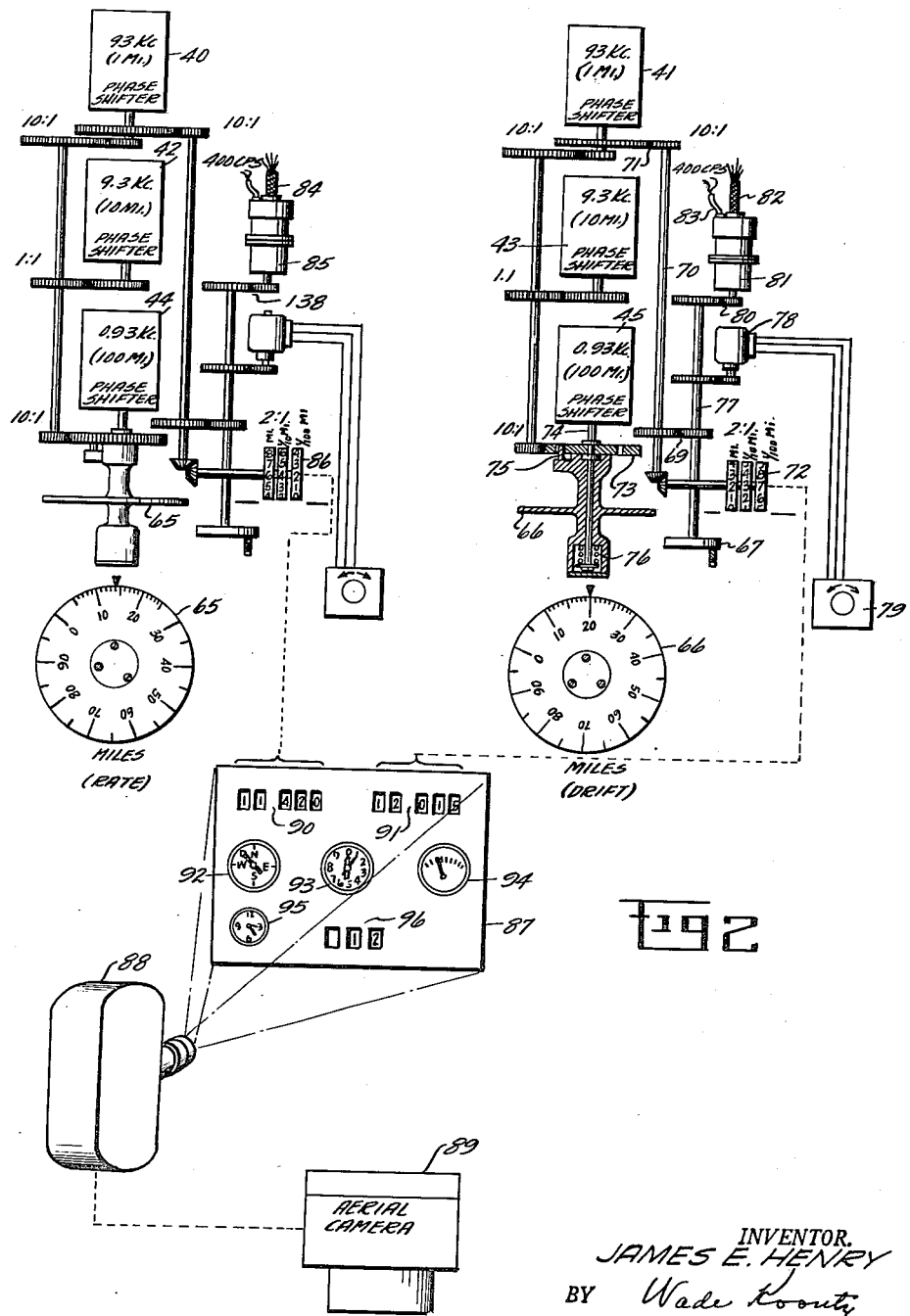

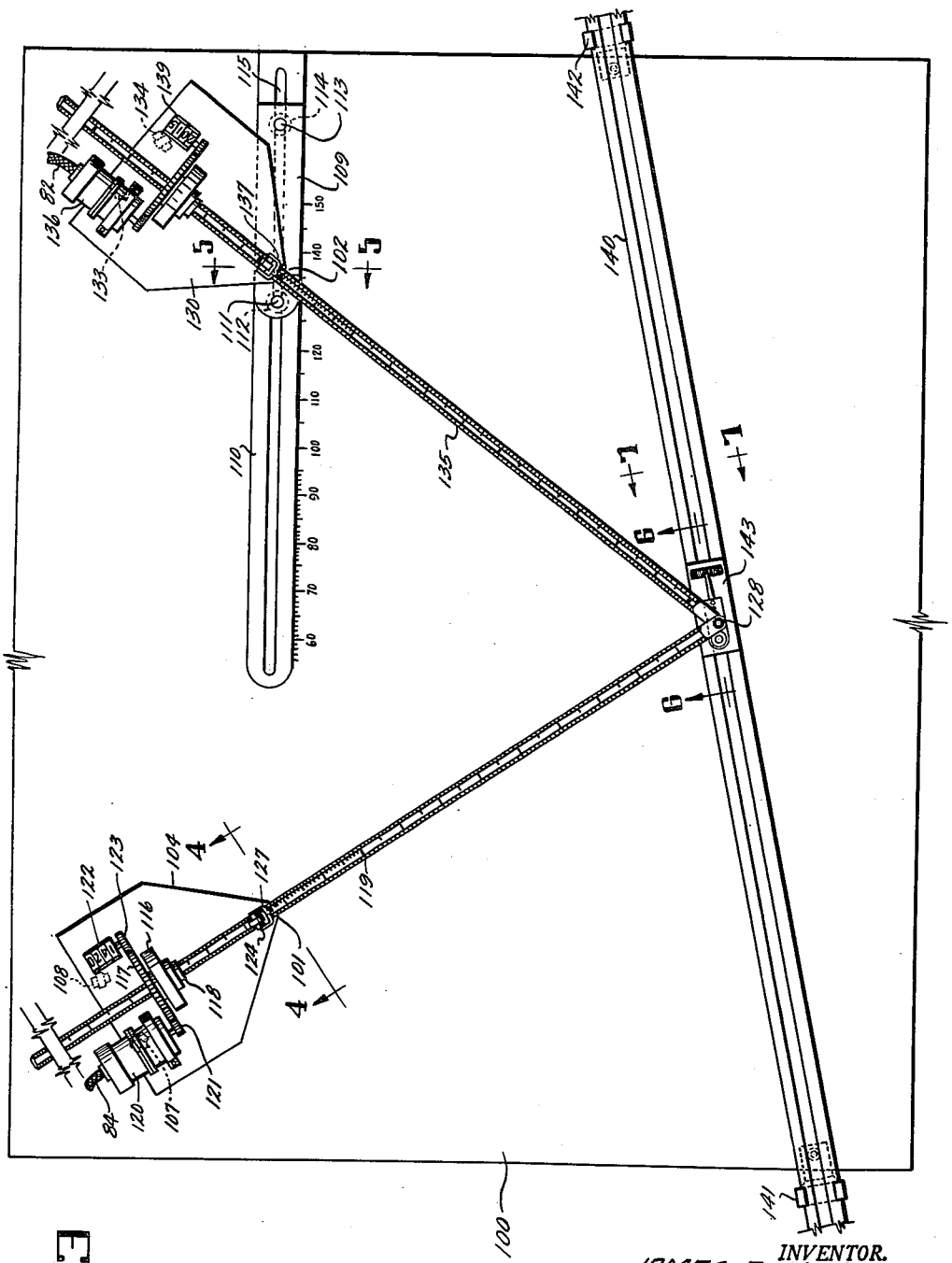

April 8, 1952            J. E. HENRY            2,591,698
SHORAN MECHANICAL STRAIGHT-LINE COMPUTER
Filed Jan. 15, 1947            4 Sheets—Sheet 4
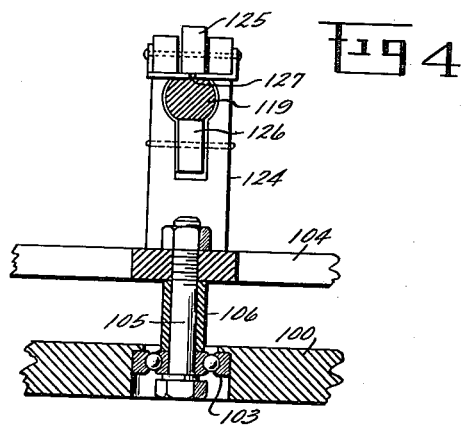
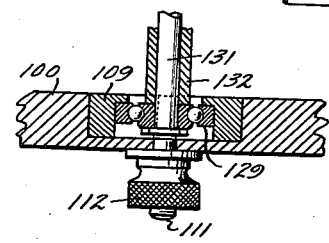
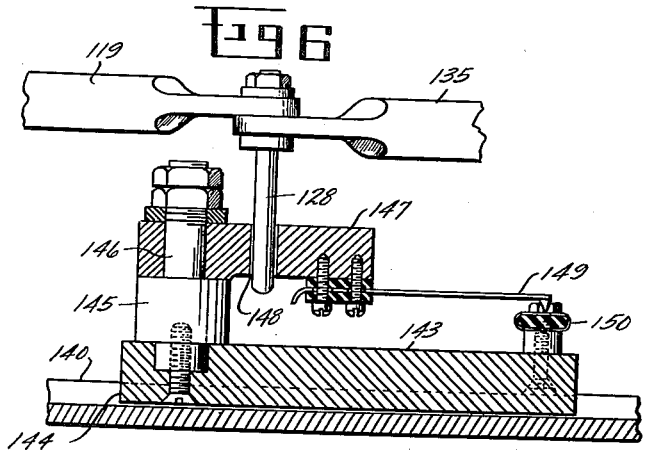
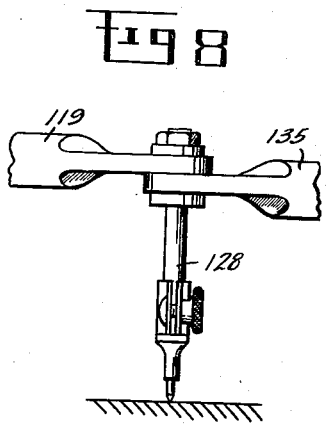
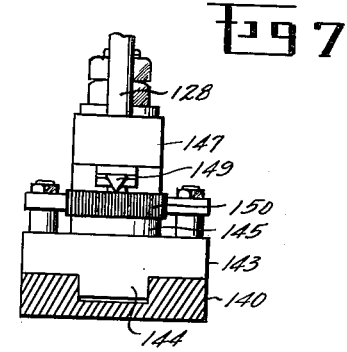
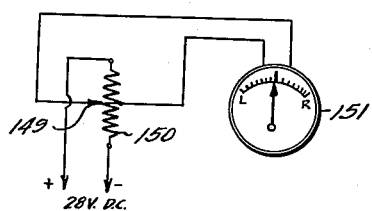
INVENTOR.
JAMES E. HENRY
BY *Wade Kovity*
ATTORNEY,
*James S. Shannon*
AGENT—

Patented Apr. 8, 1952

2,591,698

UNITED STATES PATENT OFFICE 2,591,698

SHORAN MECHANICAL STRAIGHT-LINE COMPUTER

James E. Henry, Dayton, Ohio

Application January 15, 1947, Serial No. 722,277

3 Claims. (Cl. 343—15)

(Granted under the act of March 3, 1883, as amended April 30, 1928; 370 O. G. 757)

The invention described herein may be manufactured and used by or for the Government for governmental purposes without payment to me of any royalty thereon.

This invention relates to high frequency radio navigation systems and particularly to a computer for use with such systems that will enable an airplane to fly along a preselected straight line. The principal use of the invention at present is the flying of straight and parallel photographic flight lines for aerial mapping, however, there are a number of other uses as will be pointed out.

High frequency radio navigation systems of the type identified by the name Shoran consist of two ground stations and an airborne station. One of the ground stations is termed the "rate" station and the other the "drift" station. The airborne station transmits series of rate pulses and series of drift pulses at different frequencies during alternate intervals of about 0.1 second. Each rate pulse triggers the ground station tuned to the rate frequency, which transmits a pulse back to the airborne station. Similarly the drift station is triggered by each drift pulse and transmits a pulse to the equipment in the airplane. The time required for the rate and drift pulses to travel to the corresponding ground stations and back to the airplane is indicative of the distance between the airplane and the two ground stations. These distances are referred to as the Shoran distances and may be read directly in miles on the airborne equipment. The Shoran distances place the airplane on the circumferences of two circles centered on the rate and drift ground stations. The airplane must therefore be at the intersection of the two circles. Since there will be two points of intersection for all cases except those wherein the airplane is located in a vertical plane through the two ground stations, the result is ambiguous; however, since the two possible positions of the airplane are usually far removed, errors due to this cause are not likely to occur.

The Shoran distances indicated by the airborne equipment are not exactly equal to the straight line distances between the two ground stations and the airplane, nor to the great circle distances from the ground stations to a point on the surface of the earth directly beneath the airplane. The principal factors causing these inequalities are (a) the refraction of radio waves by the earth's atmosphere, (b) the difference in altitude between the plane and the ground stations and (c) the curvature of the earth. In order to find the straight line distances, or the great circle distances which are important in mapping, it is necessary to apply to the Shoran distances a correction that takes into account the above-mentioned factors.

Since the system operates at high frequencies of from 200 to 300 megacycles per second, line-of-sight transmission conditions must exist between the ground stations and the airplane. Therefore, the range of the system is dependent upon the altitudes of the ground stations and the airplane and upon the character of the terrain. For flat terrain, with the ground stations near ground level and the airplane at 20,000 feet, the range is about 200 miles. The most probable error of the system is about ± 50 feet.

The computer which forms the subject matter of this invention is designed to be carried in the airplane and to obtain its data from the airborne part of the above described Shoran system. It consists essentially of a scale model of the two ground stations and the airplane on a plane surface representing the surface of the earth. The distance between the two points representing the two ground stations on the plane surface may be adjusted to represent to a given scale the distance between the ground stations of the Shoran system with which the computer is being used. Each ground station point on the scale model has a frame freely pivotable around it and supporting a mechanism for moving a rod in or out with respect to the ground station point. The two rods are joined at their outer ends by means of a vertical pin, the center of which represents the airplane. The two rods are graduated in miles from the center of the pin toward the ground station points, using the same scale as that used to space the ground station points. The rod moving mechanism at the scale model point corresponding to the rate ground station is synchronized with the rate mileage indicating dials of the Shoran equipment. Likewise the mechanism at the scale model point representing the drift ground station is synchronized with the drift mileage indicating dials of the Shoran equipment. As the position of the airplane changes with respect to the two ground stations, the readings of the rate and drift mileage dials of the Shoran equipment change. These changes produce accompanying changes in the lengths of the rods between the vertical pin and the ground station points. In this way the center of the vertical pin always has the same position relative to the two ground station points as the airplane has to the two ground stations.

In order to fly a straight line with the computer, a straight track is provided which may be clamped to the plane surface in any desired position relative to the two ground station points. A flat block designed to engage the track is moved therealong by the vertical pin joining the outer ends of the two rods. The block is provided with an arm pivoted about a point directly above the center of the track. This arm is engaged by the vertical pin a short distance from the center of its pivot, so that when the vertical pin is directly above the center of the track, the arm is in its central position, and when the vertical pin is to the right or left of the track, representing a departure of the airplane from its straight line course, the arm is rotated to the right or left. This information is transmitted to the pilot by means of a pilot direction indicator controlled by a potentiometer mounted on the block and actuated by the movable arm. By placing the track at a number of successive parallel positions straight and parallel flight lines for aerial photographic mapping way be flown.

The computer may also be used for navigational purposes by placing on the plane surface a map of the area properly oriented with respect to the two ground station points. The above-mentioned track and block may then be used to fly a straight line to any point on the map. Or the track and block may be removed and a stylus placed on the vertical pin joining the ends of the computer rods. The stylus will then trace the plane's course over the map and, by observing the movement of the stylus, the plane may be directed to any point on the map. This arrangement is useful for night photo reconnaissance and in bombing operations over any desired point within the range of the Shoran system. Also by observing the course of the plane on the map as recorded by the stylus, the true heading of the airplane may be determined.

It is therefore the object of this invention to provide a means for flying straight and parallel lines, the positions of which with respect to two ground points may be determined with a high degree of accuracy. It is a further object to provide a means which may be used in conjunction with a map of an area to provide precise navigation over the area.

A specific embodiment of the invention will be described in connection with the accompanying drawings in which:

Fig. 1 shows a Shoran system in block form;

Fig. 2 shows the phase shifters and mileage indicators used in the airborne portion of Fig. 1;

Fig. 3 is a plan view of the computer;

Figs. 4, 5, 6, 7 and 8 show details of Fig. 3; and

Fig. 9 shows the electrical circuit for the pilot direction indicator.

In order to make clear the operation of the computer, it is necessary to explain in some detail the operation of the Shoran system. Referring to Fig. 1, the Shoran system is seen to comprise three main components, namely, the airborne equipment, the rate ground station and the drift ground station. The operation of the airborne equipment, which will be considered first, is controlled by a crystal oscillator 1 of high frequency stability. The frequency of this oscillator is 93,109 cycles per second. This frequency is used in order to have the period of one cycle equal to the time required for a radio wave to travel one mile and back, which is $1/93,109$ second. The output of oscillator 1 is applied to frequency divider 2 which in turn has its output applied to frequency divider 3. Each of these frequency dividers reduces the frequency by a factor of 10 so that the output of frequency divider 2 is 9,310.9 cycles per second and that of frequency divider 3 is 931.09 cycles per second. For convenience these three frequencies will hereafter be referred to as 93 kc., 9.3 kc., and 0.93 kc. respectively.

The outputs of oscillators 1 and frequency dividers 2 and 3 are applied to quadrature networks 4, 5 and 6 respectively. Each of these networks converts the applied voltage into two voltages having a ninety degree phase relationship. One of the two 93 kc. quadrature voltages from network 4 is applied through lead 7 to the upper one mile contact of range switch 9 and the other through lead 8 to the lower one mile contact of switch 9. Similarly the 9.3 kc. and 0.93 kc. quadrature voltages from networks 5 and 6 are applied to the upper and lower 10 mile contacts and the upper and lower 100 mile contacts respectively of switch 9. The voltage from the upper section of switch 9 is converted into two voltages that are equal with respect to ground and 180 degrees out of phase by phase inverter 10. These voltages are amplified by amplifier 11 and applied to vertical deflection plates 12 and 13 of cathode-ray tube 14. Likewise the voltage from the lower section of switch 9 is converted into voltages of opposite phase by element 15, amplified by element 16 and applied to horizontal deflection plates 17 and 18 of cathode-ray tube 14. Since the voltages obtained from the upper and lower sections of switch 9 are 90 degrees out of phase, there exists a 90 degree phase relationship between the vertical deflection plate voltages and the horizontal deflection plate voltages. This results in a revolving electric field which causes the electron beam of tube 14 to revolve and describe the circle 19 on the fluorescent screen. The time required for the beam to make one revolution is determined by the frequency of the voltages applied to the deflection plates. If range switch 9 is in the upper or one mile position, the applied frequency is 93 kc. and the beam makes one revolution in $1/93,000$ second, or the time required for a radio wave to travel one mile and return. Similarly, with switch 9 in the 10 mile or 100 mile positions, the beam makes one revolution in the time required for a radio wave to travel 10 miles or 100 miles and return.

The output voltages of oscillator 1 and frequency dividers 2 and 3 are also applied through leads 20, 21 and 22 to phase adjusters 23, 24 and 25 respectively. The 93 kc. output of phase adjuster 23 is applied to marker pulse selector 26 through lead 27. The 9.3 kc. output of phase adjuster 24 is passed through limiter 28, differentiating circuit 29 and clipper 30 which operate on the wave to produce a series of positive pulses occurring at the rate of 9,300 per second and having lengths slightly greater than one half cycle of the 93 kc. output of phase adjuster 23. The 0.93 kc. output of phase adjuster 25 is operated on by limiter 31 and clipper 32 to produce a series of positive pulses occurring at the rate of 930 per second and having lengths greater than the lengths of the pulses from clipper 30 but less than the time interval between adjacent pulses from clipper 30. The pulse outputs of clippers 30 and 32 are applied to marker pulse selector 26 by leads 33 and 34 and are utilized to select one of the one hundred positive half cycles of the 93 kc. voltage that occur during each cycle of the 0.93 kc. voltage. This is accomplished by applying each of the voltages on leads 27, 33 and 34 to a separate grid of a vacuum tube contained in the marker pulse selector. The grids to which the voltages on leads 33 and 34 are applied are biased so that the tube is inoperative unless positive pulses are applied to these grids at the same time. By proper adjustment of the phase of these voltages by elements 23, 24 and 25, the circuit may be made to select every one hundredth positive half cycle occurring in the output of phase adjuster. This selected half cycle becomes the marker pulse and is applied through amplifier 35 and lead 36 to radial deflection electrode 37. The pulse is applied negatively so that an outward trace M is produced on the screen of the cathode-ray tube.

The rate and drift pulses for triggering the transmitter are selected from the 93 kc. voltage in the same manner as the marker pulse. The circuits employed with the rate pulse selector 38 and the drift pulse selector 39 are the same as those employed with the marker pulse selector except that the phase shifters 40 through 45 differ in design from their counterparts 23, 24 and 25 in a way which will be explained later.

The rate and drift pulses from the rate and drift pulse selectors are applied to the transmitter 50 through common lead 46. In order to transmit alternate series of rate and drift pulses, a commutater 47 is provided which performs the functions illustrated by switches 48 and 49. When these switches are in the left hand positions, the frequency of the transmitter is determined by the position of shorting bar 51, and the drift pulse selector is operative since it receives its operating potential from the left hand contact of switch 48 through lead 53. The transmitter therefore sends out a series of pulses at the drift frequency $f_d$ which are received by the drift ground station and retransmitted to the receiver 55 in the plane. Cathode follower stage 56 located in the output circuit of receiver 55 also receives its operating potential from the left hand contact of switch 48. This stage is therefore operative and passes the drift pulse from the receiver 55 to amplifier and thence by lead 36 to the radial deflection electrode. The polarity of the pulse is positive so that an inward trace D is made on the screen of the cathode-ray tube. During the period of transmitting drift pulses, the rate pulse selector and stage 58 in the output of receiver are inoperative due to the absence of operating potentials when switch 48 is in the left hand position.

After drift pulses have been transmitted for about 1/15 second, switches 48 and 49 are thrown to their right hand positions causing the rate pulse selector to become operative and disabling the drift pulse selector and cathode follower stage 56. Also shorting bar 59 becomes effective, thus decreasing the length of the transmission line and raising the transmitter frequency for the transmission of rate pulses. These pulses are received by the rate ground station 60 and retransmitted to the airborne receiver 55. Rate pulses from the output of receiver 55 are applied through stage 58, which is now supplied with operating potential by switch 48, amplifier 57 and lead 36 to radial deflection electrode 37. Since stage 58 reverses the polarity of the pulse, whereas the output of cathode follower stage 56 has the same polarity as its input, the polarity of the rate pulses applied to electrode 37 is opposite to that of the drift pulses, or negative. This causes an outward trace R to appear on the screen of the cathode-ray tube.

If the circuit is adjusted so that the radiation of the rate and drift pulse is coincident with the marker pulse, then the circular distances on the cathode-ray tube screen between the marker trace and the rate and drift traces are proportional to the distances of the aircraft from the rate and drift ground stations. One complete revolution of the rate or drift trace represents 100 miles, 10 miles or 1 mile depending upon the position of the range switch 9. However, in actual practice, a more accurate method of determining the mileages is used. This method consists in advancing the time of occurrence of the transmitted rate and drift pulses with respect to the marker pulse by an amount equal to the time required for a radio wave to travel from the airplane to the ground stations and return. The time of occurrence of the rate pulse is determined by the phase advance produced by phase shifters 40, 42 and 44 and that of the drift pulse by phase shifters 41, 43 and 45. In order for the relationship between the three voltages applied by leads 59, 60 and 61 to the rate pulse selector and 62, 63 and 64 to the drift pulse selector to remain unchanged, it is necessary that the phase shifts in the circuits supplying these voltages be made proportional to the frequency. Thus the phase shifts produced in the 9.3 kc. circuits must be 10 times, and those produced in the 93 kc. circuits 100 times, the phase shifts in the 0.93 kc. circuits. This is accomplished by means of gearing between the rate phase shifters 40, 42 and 44 and between the drift phase shifters 41, 43 and 45 as shown by the dotted lines. The ratios shown represent revolutions of the phase shifter per one revolution of the rate mileage dial 65, or the drift mileage dial 66. The phase shifters are of the linear type having two primary coils spaced 90 degrees apart physically and supplied with voltages differing in phase by 90 degrees from quadrature networks 4, 5 and 6. A single secondary coil rotatable within the primary coils forms the output circuit. The degrees of phase shift produced by rotation of the secondary coil is equal to the number of degrees through which the secondary coil is rotated. The rate and drift dials 65 and 66 are calibrated to read directly in miles so that when the rate and drift phase shifters are adjusted to produce coincidence between the R and D traces and the M trace on the cathode-ray tube screen, the distances to the rate and drift ground stations may be read directly from these dials.

The arrangement of the phase shifters is shown more clearly in Fig. 2. Referring to the right hand side of Fig. 2, it is seen that one revolution of drift mileage dial 66 is accompanied by one revolution of 0.93 kc. phase shifter 45, by 10 revolutions of 9.3 kc. phase shrifter 43, and by 100 revolutions of 93 kc. phase shifter 41. All phase shifters are driven by the hand crank 67 which is coupled through gears 69, shaft 70 and gears 71 to 93 kc. phase shifter 41. Twenty revolutions of crank 67 are required to produce one revolution of phase shifter 41. The dial 66 is graduated in miles and in addition a counter 72 is geared to shaft 70 and reads miles, tenths and hundredths. In determining the mileage, dial 66 is read to the nearest multiple of ten miles and the units, tenths and hundredths of a mile taken from counter 72. For distances greater than 100 miles, it is necessary to note the number of revolutions made by dial 66 since this dial repeats after each 100 miles. By estimating between the figures in the hundredths column, the mileage to within about 25 feet may be determined. The dial 66 incorporates a rapid adjustment feature which takes advantage of the fact that the 9.3 kc. phase shifter 43 repeats itself every ten miles, thus allowing the dial 66 and phase shifter 45 to be set to within ten miles of the proper distance without rotating phase shifters 43 and 41. This is accomplished by having gear 73 idle on shaft 74 and driving the phase shifter 45 through pin 75 in the hub of dial 66 which is splined to the shaft 74. The pin 75 may be positioned in any one of ten holes located 36 degrees apart in gear 73 by pulling the dial outward against spring 76 and rotating the dial to the desired position. In order to avoid hand cranking and to facilitate keeping the drift and marker traces on the screen of the cathode-ray tube aligned, a variable speed reversible motor 78 is employed to drive shaft 77 through a suitable reduction gear. The speed and direction of rotation of the motor is governed by the control 79. Also coupled to shaft 77 through gears 80 and driven thereby is self-synchronous generator 81 which is connected by means of cable 82 to a self-synchronous motor in the computer as will be explained later. The self-synchronous system is supplied with 400 C.P.S. power by means of cable 83. The arrangement of rate phase shifters and associated elements shown to the left in Fig. 2 is identical in all respects to the arrangement just described.

The panel 87 and camera 88 are used in photographic mapping for recording the distances to the two ground stations and other pertinent data at the instant each aerial photograph is taken. This is accomplished by synchronizing the action of camera 88 with that of aerial camera 89. Camera 88 is arranged to photograph panel 87 which has a counter 90 coupled to the rate mileage indicators 65—86 and a counter 91 coupled to the drift mileage indicators 66—72. The panel also contains a compass dial 92, an altimeter 93, an air temperature indicator 94, a clock 95 and a picture counter 96. With this data, it is possible to determine very accurately the position of each photographed area with respect to the two ground stations.

A plan view of the computer for use with the above described Shoran system is shown in Fig. 3. A plate 100, made of metal or other suitably rigid material and having a smooth flat upper surface, forms a base for the computer. Two pivot points are provided on plate 100 at 101 and 102. The details of the pivot at 101 may be seen in Fig. 4. Ball bearing 103 is pressed into plate 100 and used to support the front end of plate 104 by means of bolt 105 and sleeve 106 which positions the plate 104 at a convenient height above plate 100. Plate 104 is supported at the back by two rollers 107 and 108. The plate 104 is therefore free to pivot about the center of bolt 105. The details of the pivot at 102 are shown in Fig. 5. They are the same as for the pivot at 101 except that the ball bearing 129 is mounted in a block 109 which is slidable in the channel 110 cut in plate 100. The block 109 may be locked in place by knurled nuts 112 and 114 and stud bolts 111 and 113 mounted in the block and extending through slot 115. The plate 130 is supported at the front by bolt 131 and sleeve 132 and at the rear by rollers 133 and 134 in the same manner as plate 104. Plate 130 is therefore free to pivot about the center of bolt 131.

The support 116 is mounted on plate 104 and holds by means of a suitable bearing the gear 117 which has its hub 118 internally threaded to receive rod 119. Self-synchronous motor 120 is suitably mounted on plate 104 and drives gear 117 through pinion 121. Counter 122 is also mounted on plate 104 and is driven from gear 117 by pinion 123. The rod 119 is threaded on its sides with the top and bottom surfaces flat and is supported at the front of plate 104 between two rollers mounted in support 124. The details of this support are more clearly shown in Fig. 4. The rod 119 passes between rollers 125 and 126 which bear against the flat surfaces of the rod to provide vertical support and to prevent rotation of the rod. The pointer 127 is provided to mark the point on the upper surface of the rod directly above the center of bolt 105. The elements mounted on plate 130 and the rod 135 are identical in all respects to the elements on plate 104 and rod 119. The self-synchronous motor 120 is connected to the self-synchronous generator 85 of Fig. 2 by cable 84, and similarly the motor 136 is connected to generator 81 by cable 82. The rods 119 and 135 are joined at their outer ends by pin 128. The details of this junction are shown more clearly in Fig. 6.

The rods are graduated to read distances directly in miles, the largest division representing 10 miles and the smallest 1 mile. The distances are measured from the center of pin 128 to the centers of bolts 105 and 131 as defined by pointers 127 and 137. These distances may be read more accurately on counters 122 and 139. Since these counters repeat every 100 miles, it is necessary to observe the length of the rod to the nearest 100 miles before reading the counter. The pitch of the threads on rod 119, the scale on rod 119, the ratio of gear set 117—121 and the ratio of gear set 136 (Fig. 2) are so selected that one revolution of the 93 kc. rate phase shifter 40 causes the distance along the rod between the center of pin 128 and pointer 127 to change by one mile as measured by the scale used. Also the action of rod 135 is related to that of the drift phase shifters in the same way so that changes in the setting of these phase shifters produce corresponding changes in the length of rod 135 between the center of pin 128 and the pointer 137. If the rods are initially set so that the distances read thereon, and the distances read on counters 122 and 139, correspond to the readings of rate mileage indicator 65—86 and drift mileage indicator 66—72, then these identities will be maintained through any adjustments of the rate and drift phase shifters.

The computer represents a scale model of the two ground stations and the airplane with pivot point 101, which is the center of bolt 105, representing the rate ground station, pivot point 102, which is the center of bolt 131, representing the drift ground station, and the center of pin 128 representing the airplane. For a given Shoran installation, the distance between points 101 and 102 is made equal to the distance between the two ground stations, using the same scale as that on rods 119 and 135. This is done by locking the block 109 in the proper position along channel 110, the edge of which may be graduated in miles as shown. During flight the rate and drift phase shifters are continuously adjusted to maintain the rate and drift traces in coincidence with the marker trace on the screen of the cathode-ray tube. This is accompanied by corresponding changes in the lengths of rods 119 and 135, between pointers 127 and 137 and the center of pin 128, so that the center of pin 128 always has the same position relative to the points 101 and 102 that the airplane has relative to the two ground stations. Hence, as the airplane moves relative to the two ground stations, the center of pin 128 follows a similar path relative to points 101 and 102.

In order to fly a straight line with the aid of the computer, a straight track 140, made of metal or other suitable material, is provided. The track may be held in any position on plate 100 by clamps 141 and 142 so that the center line of the track represents the straight line that it is desired to fly. Figs. 6 and 7 show cross-sectional views of the track and also the details of one embodiment of an arrangement for producing an electrical signal indicative of any departure of the airplane from the designated straight line course. This embodiment consists of a block 143 adapted to slide along the track 140 and having a tongue 144 which engages the groove in the track. A post 145 is mounted in the center of block 143 at one end and has a reduced upper portion 146 around which arm 147 is free to pivot. The pin 128 fits in a hole 148 in arm 147 a short distance from the center about which arm 147 pivots. A conductive slider element 149 is fastened to the end of arm 147, but is electrically insulated therefrom, and contacts the resistance element 150. The circuit in which the resistor 150 and slider 149 are connected is shown in Fig. 9. If the slider is in the center of resistor 150, zero voltage is applied to pilot direction indicator 151 which then gives an on-course indication. Displacement of the slider to one side or the other of center causes a voltage to be applied to the indicator 151 having a value proportional to the amount of displacement and a polarity depending upon the direction of the displacement, thus causing a corresponding right or left displacement of the indicator pointer. If the airplane is travelling along the straight line designated by the center line of track 140, then the center of pin 128 is exactly over the center of the track. Arm 147 and slider 149 are therefore in their control positions and an on-course indication is given by pilot direction indicator 151. If, however, the airplane departs from the course to the right or left, the center of pin 128 moves to the right or left of the center of the track, thus displacing slider 149 from its central position on resistor 150 and thereby causing indicator 151 to show that the airplane is off-course to the right or left. The pilot can then make appropriate corrections to keep the airplane on the designated course. By placing the track 140 at successive parallel positions, a number of straight and parallel photographic flight lines may be flown, thus the above-described arrangement provides a highly accurate means for aerial photographic mapping.

If the Shoran system is set up in a known area for which a map is available, then the computer may be used to obtain precise navigation over the area. For this purpose the track 140 and block 143 with its associated elements are removed and a map, to the same scale as that used on the computer, is placed on the plate 100 and properly oriented with respect to the two ground station points 101 and 102. If a stylus is attached to pin 128 as shown in Fig. 8, then the computer will record the travel of the airplane over the area. Or by observing the movement of the stylus and directing the airplane accordingly, accurate navigation over any course drawn on the map may be obtained. The track 140 could also be used to provide straight line flight between any two points using the pilot direction indicator as previously described.

I claim:

1. A system for navigating an object with respect to two fixed reference points, said system comprising means carried by said object for continuously measuring the distances from said object to said two fixed reference points, means also carried by said object for establishing two additional reference points corresponding to said two fixed reference points and separated by a distance equal at a reduced scale to the distance between said two fixed reference points, means providing a movable point, means establishing said movable point on the circumference of two circles having as centers the two additional reference points, means for continuously adjusting the radii of said circles to always equal at said reduced scale the corresponding measured distances from said object to said reference points, track means defining a path having a position relative to said two additional reference points corresponding to the position of a desired path of navigation relative to said two fixed reference points, a carriage movable along said track means, an arm pivotally mounted on said carriage about a vertical axis passing through the path defined by said track, means also pivoting said arm about a vertical axis passing through said movable point, whereby displacement of said movable point from said defined path results in rotation of said arm, a potentiometer mounted on said carriage and having a movable contact mounted on said arm, said potentiometer also having a tap intermediate its ends and located adjacent to said movable contact when the displacement of said movable point from said defined path is zero, means for maintaining a direct voltage across said potentiometer, and means connecting an output circuit between said contact and said tap.

2. Apparatus as claimed in claim 1 in which the distance between said additional reference points is adjustable and in which the position of said track means relative to said two additional reference points is adjustable.

3. A system for navigating an object with respect to two fixed reference points, said system comprising means carried by said object for continuously measuring the distances from said object to said two fixed reference points, means also carried by said object providing a plane surface, means establishing two additional reference points on said plane surface corresponding to said two fixed reference points and separated by a distance equal at a reduced scale to the distance between said two fixed reference points, a first rod, rod supporting and adjusting means pivotable about one of said additional reference points for positioning said first rod with its center line parallel to said plane surface and directly above said one additional reference point and for adjusting the distance between the end of said first rod and said one additional reference point, a second rod, rod supporting and adjusting means pivotable about the other of said additional reference points for positioning said second rod with its center line parallel to said plane surface and directly above said other additional reference point and for adjusting the distance between the end of said second rod and said other additional reference point, a pin passed through said rods near their ends so that the pin is perpendicular to said plane surface and so that the center line of the pin intersects the center lines of both rods, means linking said rod adjusting means and said distance measuring means for maintaining the distances along said rods between said additional reference points and the center line of said pin always equal at said reduced scale to the corresponding distances between said object and said two fixed reference points, means for navigating said object along a straight line course, said means comprising a straight track, means for positioning said track on said plane surface so that the center line of said track has the same position relative to said two additional reference points that the desired straight line course has to said two fixed reference points, a carriage movable along said track, an arm pivotally mounted on said carriage about a vertical axis through the center line of said track and engaged by said pin whereby movement of said pin transversely to the center line of said track produces rotation of said arm, and means for indicating the amount and sense of the rotation of said arm away from the position assumed when the axis of said pin intersects the center line of said track.

JAMES E. HENRY.

REFERENCES CITED

The following references are of record in the file of this patent:

UNITED STATES PATENTS

| Number | Name | Date |
|---|---|---|
| 422,104 | Yount | Feb. 25, 1890 |
| 1,191,906 | Miller | July 18, 1916 |
| 1,779,818 | Longyear | Oct. 28, 1930 |
| 1,930,945 | Sjostrand | Oct. 17, 1933 |
| 2,341,418 | Atkins | Feb. 8, 1944 |
| 2,366,772 | Ebeling | Jan. 9, 1945 |
| 2,422,025 | Luck | June 10, 1947 |
| 2,427,219 | Luck | Sept. 9, 1947 |
| 2,427,220 | Luck | Sept. 9, 1947 |
| 2,526,287 | Seeley | Oct. 17, 1950 |

FOREIGN PATENTS

| Number | Country | Date |
|---|---|---|
| 300,697 | Great Britain | Nov. 19, 1928 |
| 543,886 | Great Britain | Mar. 18, 1942 |